(No Model.)  2 Sheets—Sheet 1.

W. P. BREWIN.
HOT AIR FURNACE.

No. 252,016. Patented Jan. 10, 1882.

WITNESSES
J. W. Garner
W. S. O'Hara

INVENTOR
W. P. Brewin
By Mowlts & Ennis
ATTORNEYS (No Model.) 2 Sheets—Sheet 2.
W. P. BREWIN.
HOT AIR FURNACE.

No. 252,016. Patented Jan. 10, 1882.

ADDRESSG# UNITED STATES PATENT OFFICE.

WILLIAM P. BREWIN, OF CAMDEN, NEW JERSEY.

HOT-AIR FURNACE.

SPECIFICATION forming part of Letters Patent No. 252,016, dated January 10, 1882.

Application filed April 16, 1881. (No model.)

*To all whom it may concern:*

Be it known that I, WILLIAM P. BREWIN, a citizen of the United States, residing at Camden, in the county of Camden and State of New Jersey, have invented certain new and useful Improvements in Hot-Air Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
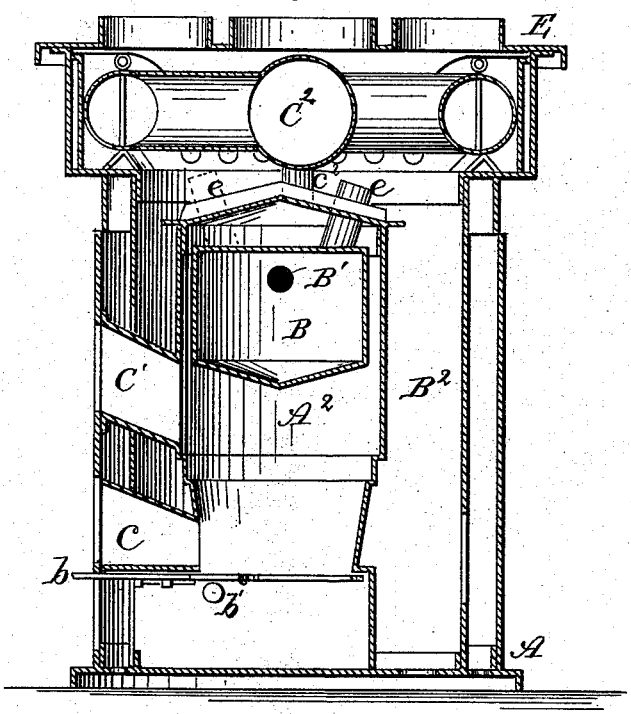
Figure 2:
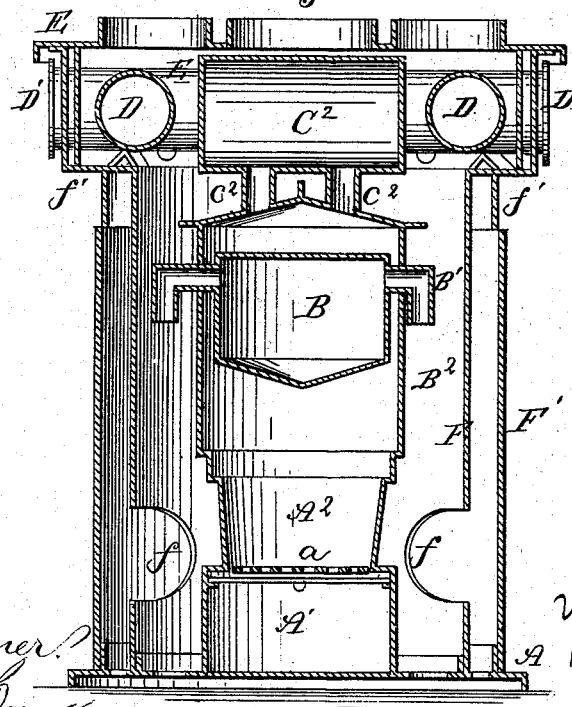
Figure 3:
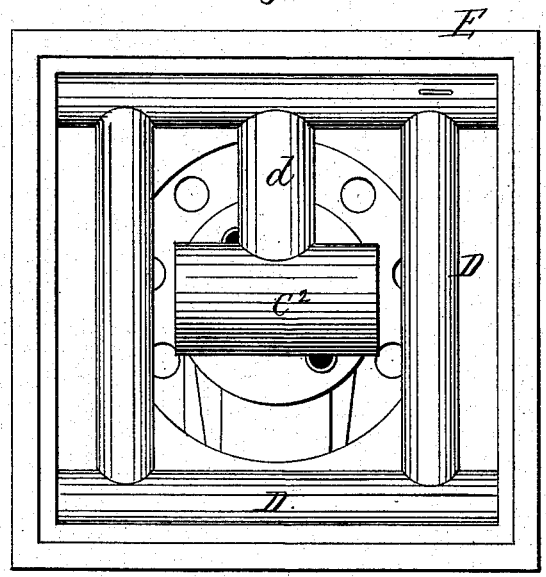
Figure 4:
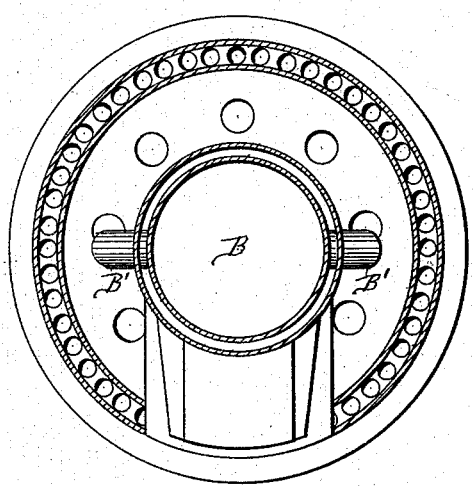

Figure 1 is a vertical section of my improved hot-air furnace. Fig. 2 is a similar view thereof at right angles to Fig. 1. Fig. 3 is a top plan view, and Fig. 4 is a horizontal section, of the same.

This invention relates to certain improvements in hot-air furnaces, having principally for its object to protect the deflector-bottom, to promote the supply of hot air, to facilitate the cleaning of the drums, and to effect the removal of clinkers without disturbing the whole mass or body of fire; and it consists in novel features of construction and combination and arrangement of parts, all as hereinafter more fully set forth.

Referring to the accompanying drawings, A is the base, upon which is cast the ash-pit A', above which is arranged the fire-pot A². Upon the under side of the grate *a* is arranged the operating-lever *b*.

C is the aperture through which to rake the fire and remove slate and clinkers.

C' is a chute for feeding fuel into the furnace.

B is the deflector, suspended by pipe-elbows B' within the upper part of the furnace, with their depending ends opening into the cool-air chamber B², to receive the air therefrom and conduct it up and out the pipes *e e* into and around the drums D D and C², and thus protect the bottom of the deflector and at the same time increase the volume of hot air. The superposed drum C² is connected with the top of the heater by the collars or pipes $c^2$ $c^2$, through which the smoke and flame pass into the drum C², from thence through the pipe *d* into the rectangularly-arranged drums D D, and are conveyed from thence into the chimney. The ends of the drums D D are provided with movable stoppers or caps D', to permit of the removal of any deposit of soot, &c., in said drums.

F F' are the walls of the heater-casing, the inner one having the aperture *f* in its lower portion and resting upon the base A, being flanged outwardly, as at *f'*, at its upper end, thus forming the bottom of the casing E. The outer wall, with an intervening space between it and the inner one, stands below the upper edge of the latter to permit of the admission of cold air into the aforesaid space, after which it passes from thence through the apertures *f f* into the chamber B², and from thence through the pipes B' of the deflector, and up through and out of the pipes *e e* around the drums D D and C².

Having thus fully described my invention, I claim and desire to secure by Letters Patent—

In a hot-air furnace, the combination, with the hollow deflector B, of the inlet elbow-pipes B' B' and outlet-pipes *e e*, both opening into the cold-air chamber B², superposed drum C², communicating with said deflector by pipes $c^2$ $c^2$, and the drums D D, communicating with drum C² by pipe *d*, the several parts arranged relatively to each other substantially in the manner herein shown and described.

In testimony whereof I have signed my name in the presence of two witnesses.

WILLIAM P. BREWIN.

Witnesses:
C. B. ROBERTS,
THOMAS D. MOWLDS.